April 26, 1927.
G. H. E. DE RAM
SUSPENSION OF AUTOMOBILES AND OTHER VEHICLES
Filed Nov. 20, 1922
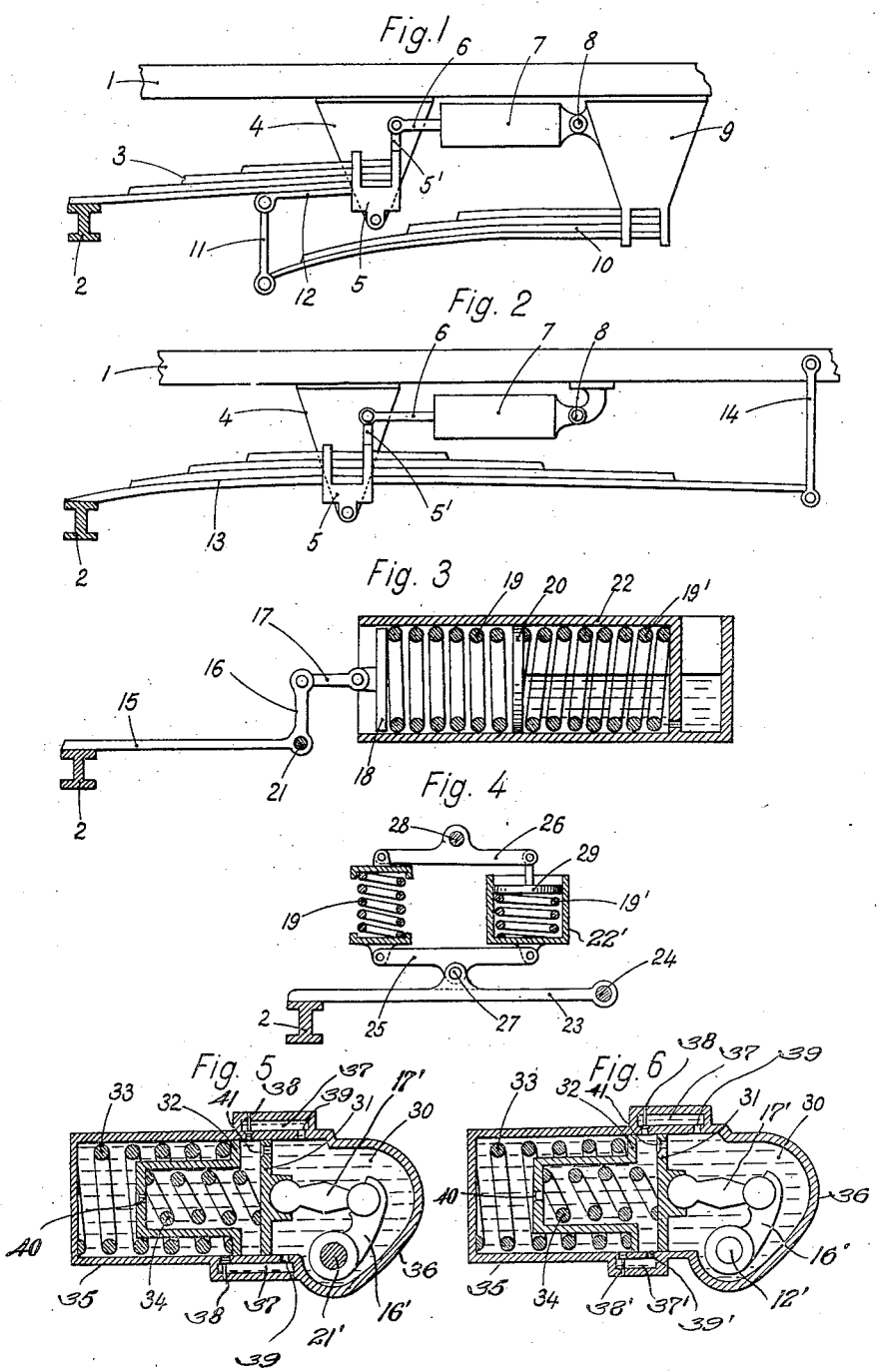
INVENTOR Patented Apr. 26, 1927.

1,626,188

UNITED STATES PATENT OFFICE.

GEORGES HENRI ERNEST DE RAM, OF BOULOGNE-SUR-SEINE, FRANCE.

SUSPENSION OF AUTOMOBILES AND OTHER VEHICLES.

Application filed November 20, 1922, Serial No. 602,296, and in France December 5, 1921.

This invention has reference to means for varying the flexibility of the suspensions of automobiles and other vehicles.

Theory indicates that the flexibility should continue to diminish in proportion as the speed increases; it must even diminish in inverse ratio to the square of the speed under certain conditions.

The means for varying the flexibility of the suspensions of automobile and other vehicles according to this invention comply with the condition set forth above.

In the accompanying drawings which are somewhat of a diagrammatic character, Figure 1 is an elevation of a suspension arrangement according to this invention;

Figure 2 shows a modification of the suspension shown in Figure 1.

Figure 3 shows a modification in which coiled springs are employed.

Figure 4 shows a modification of the arrangement shown in Figure 3, and

Figures 5 and 6 are sections of combinations of coiled springs with a corrector of flexibility.

On referring to Figure 1, the chassis is shown at 1 and the axle at 2; 4 and 9 being rigidly fixed to the chassis 1.

The suspension arrangement comprises two springs of the leaf or blade type 3 and 10 the first of which, of a low degree of flexibility, is capable of ensuring a good suspension at high speeds whilst the second, of great flexibility on the contrary, gives a very mild or gentle suspension at low speed.

The spring 3 is fixed, on the one hand, to the axle and, on the other hand, to a plate 5 pivoted to the bracket 4 on the chassis 1. The plate 5 comprises an arm 5' articulated to a rod 6 of a liquid brake or damping device 7, articulated at 8 to the bracket 9. At low speeds this brake offers a slight resistance to the angular displacements of the arm 5'. The springs 3 and 10 act simultaneously, the spring 10 being influenced through the medium of the connecting rod 11 pivoted on the one hand, to the spring 10 and, on the other hand to a short member 12 integral with the plate 5. The flexibility is then at the maximum. As the speed of the vehicle increases, the jolts become more and more rapid; the shocks and impulses given the spring 3 by the irregularities in the roadway are communicated to the plate 5, but as the plate 5 is directly connected to the damping device 7, which prevents rapid oscillation of the plate 5, the result of the damping device is to maintain the plate 5 in substantially stationary position, since the damping device is relatively slow moving and is being subjected to a rapid succession of impulses in opposite directions.

In Figure 2 is shown a modification of the suspension means above described. In this arrangement, the two springs 3 and 10 are replaced by a single cantilever spring with unequal arms 13. This spring is connected at one end directly with the axle 2 and, at the other end, to a connecting rod 14 pivoted to the chassis 1.

The arm of the spring which is connected to the axle is short and only slightly flexible, whilst the arm articulated to the chassis by a connecting rod 14 is long and flexible. The brake or damping device 7 is actuated in the same manner as above described, by the angular displacement of the plate 5 and its action gives the same results as those of the arrangement shown in Figure 1.

In the modification shown in Figure 3 coiled springs are employed, the brake or damping device being shown in an entirely diagrammatic manner. In this case the large arm 15 of an elbow lever pivoted at 21 to the chassis is connected directly to the axle 2. The other arm 16 is pivoted to a connecting rod 17, which transmits the displacements of the elbow lever to a disc 18 adapted to be displaced in a cylinder 22 fixed to the chassis. In this cylinder there are two coiled springs 19 and 19' separated by a disc or hermetic piston 20. The part of the cylinder in which the spring 19' is located constitutes the brake or damping device, the part played by which is the same as that of the device shewn at 7 in Figures 1 and 2.

The working of the whole is the same as that of the arrangements with a plate spring; in this case, the spring 19 is less flexible than the spring 19' and when the jolts or vibrations of the axle 2 are relatively slow, both springs 19 and 19' and the fluid pressure medium in cylinder 22 are effective, but a rapid series of jolts or vibrations imparted to the axle, the resistance offered by the fluid pressure medium will prevent the rapid movement of piston 20, the latter will remain substantially stationary, and the vibrations will be taken up by the stout spring 19.

Figure 4 shows an arrangement similar to that which has just been described with reference to Figure 3, the two springs, however, being arranged in a different manner.

A lever 23 is connected, at one end, to the axle 2 and pivoted at the other end to the chassis at 24. At a point 27 of the said lever, there is pivoted a balance arm 25 to the ends of which there are pivoted, at the one end, the supporting plate of the spring 19 and, at the other end, the cylinder 22' of the brake or damping device in which the spring 19' is located. A second balance or oscillating arm 26 pivoted at 28 upon the frame comprises at one end, the second plate of the spring 19 and, at the other end the piston 29 of the brake.

The operation of this arrangement is the same as that described with reference to Figures 1, 2 and 3 and the result obtained conforms to the conditions imposed, that is to say the slow vibrations will be taken up by both springs 19, 19' and the fluid pressure in cylinder 22', but rapid vibrations will be restricted by the fluid pressure medium and the relatively heavy spring 19 will take up the vibrations.

Figures 5 and 6 show, in a purely diagrammatic manner, the combination of the corrector of flexibility with a suspension by coiled spring and suspension brake.

Referring to Fig. 5, 35 is a cylinder adapted to be attached to the chassis, the cylinder being extended to form a liquid tight casing 36, the cylinder and casing being connected by ducts 37 provided with outwardly opening check valves 38 and open ducts 39. Mounted in the cylinder 35 is a piston 32, which is engaged by a relatively stout spring 33 interposed between said piston and the end of the cylinder. The piston 32 is provided with a check valve 40 opening toward the end of the cylinder 35. A second piston 31 is slidably mounted in the cylinder 35 and between the pistons 31 and 32 is interposed a helical spring 34 of considerable less strength than spring 32. The piston 31 is likewise provided with a check valve 41 opening toward the piston 32.

Piston 32 is connected by a link 17' with a rock arm 16', fixed to a shaft 21', which, in turn, is adapted to be connected to the axle of the vehicle in substantially the same manner as illustrated in Fig. 3.

The cylinder 35 and casing 36 contains a body of fluid 30, and, as the rock lever 16' responds to relatively slow vibrations of the vehicle axle, the fluid in the cylinder ahead of pistons 31 and 32 will be forced out of the cylinder 35 past check valves 38, 38 and into the casing 36, both springs 33 and 34 being operative to take up the vibrations. When the vibrations of the axle, however, are rapid, the restricted openings closed by the check valves 38, prevent the rapid escape of the fluid from the cylinder 35 into the casing 36, so that the vibrations will be taken up largely by the stouter spring 33. When the pistons 31 and 32 are returned to normal position, the fluid pressure will pass freely from casing 36 through check valves 41, 40 in the respective pistons, as will be understood.

In the modification shown in Fig. 6, the only substantial difference is that the lower duct 37' connects the spaces ahead of pistons 31 and 32, so that the fluid pressure medium forced out of the portion of cylinder 35 ahead of piston 32, passes into the portion of the cylinder ahead of piston 31 and thence by way of check valve 38 and duct 37 into the casing 36. It will be apparent, however, that the operation of this form of the device is substantially the same as that shown in Fig. 5, the slow or widely separated vibrations of the vehicle axle being taken up by both springs 33 and 34 and the fluid pressure medium, while the rapidly recurring vibrations, to which the fluid medium will not respond, are taken up primarily by the heavier spring 33.

In the same way the order of mounting springs 33 and 34 could be reversed.

Claims:

1. In a vehicle suspension, the combination of two springs of different flexibility, and a damping device associated with said springs and adapted to permit the simultaneous action of both of said springs under slow vibrations and to decrease the effectiveness of one of said springs under relatively rapid vibrations.

2. In a vehicle suspension, the combination of a spring of relatively great flexibility, a spring of relatively small flexibility, and a fluid pressure damping device adapted to suppress the action of said first named spring at relatively high rates of vibrations.

3. In a vehicle suspension, a cylinder, a spring in said cylinder of relatively great flexibility, a second spring associated therewith of relatively small flexibility, a piston, and a fluid in said cylinder adapted to suppress the action of said first named spring at relatively high rates of vibration.

4. In a vehicle suspension, a fluid containing cylinder, a piston therein, a spring associated with said piston and said cylinder, a second piston in said cylinder, a spring associated with said second piston, said springs having different degrees of flexibility, and valves adapted to control the passage of fluid from one side to the other of said pistons.

In testimony whereof I affix my signature.

GEORGES HENRI ERNEST DE RAM.